United States Patent Office 3,629,191
Patented Dec. 21, 1971

3,629,191
UV-ABSORBING HYDROXYPHENYL-
BENZOTRIAZOLES
Hansjorg Heller, Riehen, Jean Rody, Basel, and Ernst
Keller, Binningen, Basel-Land, Switzerland, assignors
to J. R. Geigy A.G., Basel, Switzerland
No Drawing. Continuation-in-part of application Ser. No.
544,834, Apr. 25, 1966, which is a continuation-in-
part of applications Ser. No. 202,664, Ser. No. 202,665,
Ser. No. 202,666, Ser. No. 202,667, and Ser. No.
202,668, all June 15, 1962, Ser. No. 328,480, Dec. 6,
1963, and Ser. No. 535,740, Mar. 21, 1966. This appli-
cation Dec. 11 1969, Ser. No. 884,363
Claims priority, application Switzerland, June 16, 1961,
7,099/61
Int. Cl. C08f 45/60; C08g 51/60
U.S. Cl. 260—45.8
12 Claims

ABSTRACT OF THE DISCLOSURE

Light-stabilizers for polymeric light-sensitive products
and materials are provided which pertain to the class of
2-(2'-hydroxyphenyl)-benzotriazoles. Compositions of
the compounds and the light-sensitive materials are also
provided.

---

This application is a continuation-in-part application
of application Ser. No. 544,834, filed on Apr. 25, 1966,
which is in turn a continuation-in-part of applications
Ser. Nos. 202,664; 202,665; 202,666; 202,667 and 202,668
all filed on June 15, 1962; Ser. No. 328,480, filed Dec. 6,
1963; and Ser. No. 535,740, filed Mar. 21, 1966, all of said
prior applications now being abandoned.

The present invention encompasses new substituted 2-
(2'-hydroxyphenyl)-benzotriazoles, compositions contain-
ing these new substituted 2-(2'-hydroxyphenyl)-benzotri-
azoles as well as processes for preparing said composi-
tions.

These new substituted 2-(2'-hydroxyphenyl)-benzotri-
azole compounds are useful for the protection of light-
sensitive organic materials, i.e. of high polymeric mate-
rials, by physically admixing them with the said light-
sensitive materials, and for the production of UV filters.

Light-stabilizers for polymeric light-sensitive products
and materials have been known for some time, which
pertain to the class of 2-(2'-hydroxyphenyl)-benzotri-
azoles. The compounds are distinguished from other light-
stabilizing agents by possessing in their absorption spec-
trum maxima in the ultraviolet region, the peak of one of
which is usually around 300 millimicrons, which range is
referred to hereinafter as the short wavelength range,
while the other peak is usually at wavelengths above 320
millimicrons, the range of which is referred to hereinafter
as the long wavelength range.

It has been found that certain substituted 2-(2'-hydroxy-
phenyl)-benzotriazole compounds are valuable ultraviolet
light (UV) absorbers and accordingly can be used for
the protection of light-sensitive organic materials. More-
over, those containing a β-mercapto propionyl moiety have
been found to possess antioxidant properties.

The compositions according to the invention comprise
physical mixtures of the novel substituted benzotriazole
compounds and light-sensitive organic material. Thus the
components of the compositions must be so chosen as to
assure formation of a mere physical mixture. In other
words, benzotriazole compounds having an ethylenically
unsaturated group must not be admixed with ethylenically
unsaturated monomers prior to polymerization. Further-
more, benzotriazole compounds containing a carboxyl
group or an alcoholic hydroxyl group or a non-aromatic
group or equivalently reacting derivatives thereof should
neither be admixed with condensation monomers prior to
polycondensation, nor should they be admixed with pre-
formed polymers under conditions which would cause the
chemical introduction of said benzotriazole compounds
into the polymeric chain.

According to the invention, it has been found that valu-
able light stabilizers are obtained if an azo dyestuff of the
formula

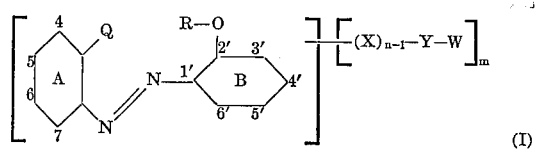

(I)

wherein R represents hydrogen, an alkyl, aralkyl or an
acyl group, and Q represents the nitro group or the pri-
mary amino group, is (i) reduced when said Q is the nitro
group or is oxidized when said Q is the primary amino
group, and (ii) the hydroxyl group in the 2'-position is
liberated if esterified or etherified to form a triazole com-
pound of the formula

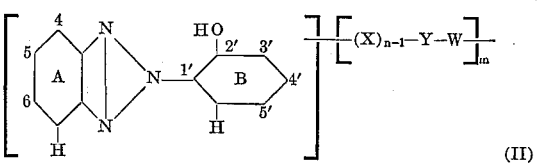

(II)

In these formulas: X represents a divalent bridging group

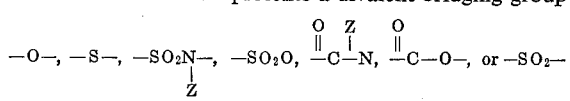

wherein Z is hydrogen or an alkyl, preferably lower alkyl
group and the X moiety is bound to the nucleus A and/or
B by way of O, S or C, to nucleus B, preferably by way of
O; Y represents a divalent aliphatic, cycloaliphatic, mono-
cyclic araliphatic or monocyclic aromatic radical, whereby
hetero atoms possibly contained in said radicals are sep-
arated by at least two carbon atoms from one another
or from hetero atoms contained in Y and W; W repre-
sents the CN—, a CONR'R"— or a COOR— group in
which R, R' or R" are independently hydrogen, an alkyl,
cycloalkyl, monocyclic aralkyl or monocyclic aryl radical;
m and n each independently represent 1 or 2;
and wherein nucleus A is a monocyclic arylene radical,
if desired substituted in positions 4, 5 and 6 by prefer-
ably at most two of the following substituents, alkyl,
alkoxy, carboxy, carboxylic acid ester, carboxylic acid
amide, sulphonic acid amide, alkyl sulphonyl groups or
halogen, nucleus B is a monocyclic arylene radical
which besides the hydroxy group in the 2'-position is
possibly substituted in preferably at most two of the
positions 3', 4' and 5' by hydrocarbon groups and
alkoxy groups and wherein the grouping

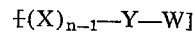

is bound to at least one of the said positions 4, 5, 6, 3',
4', or 5'.

If benzene ring A is substituted, it can contain, for ex-
ample, halogens such as fluorine, chlorine or bromine,
also alkyl groups such as methyl, ethyl, n-propyl, iso-
propyl, n-, iso- or tert, butyl groups, alkoxy groups such
as methoxy or butoxy groups, carboxylic acid groups, car-
boxylic acid ester groups, i.e. carboxylic acid alkylester
groups such as carbomethoxy, carboethoxy, carbopropoxy
or carbobutoxy groups, carboxylic acid or sulphonic acid
amide groups possibly aliphatically, cycloaliphatically,
araliphatically, or aromatically substituted at the nitrogen
atom such as carboxylic acid or sulphonic acid amide,
methylamide, ethylamide, cyclohexylamide, benzylamide,
phenylamide, dimethylamide, diethylamide, N-methyl-N- cyclohexylamide, γ-methoxypropylamide, piperidide or morpholide groups, as well as alkylsulphonyl groups such as methyl or ethyl sulfonyl groups. If the benezene ring B is substituted it can contain open chain or cyclic hydrocarbon groups such as methyl, ethyl, benzyl, cyclohexyl or phenyl groups, alkoxy groups such as methoxy, ethoxy, propoxy, isopropoxy or n-butoxy groups, or halogens such as chlorine or bromine.

If the moiety $\{(X)_{n-1}-Y-W\}$ is attached to nucleus A then it is linked preferably to the 5-position. If it is linked to the 3'-position of nucleus B it is important that the moiety does not from spontaneously a 5 or 6 membered lactone ring with the hydroxy group in the 2'-position. This would exclude such moieties as the —CH$_2$COOH or —CH$_2$CH$_2$COOH groups, in said 3'-position.

Benztriazole compounds which absorb particularly at long wave lengths are obtained if the starting materials are so chosen that, in the end products, acidifying substitutents are present in the 4- and/or 5-position and basifying substituents are present in the 3'- and/or 5'-position. Benztriazole compounds having particularly high molar extinction in the range of 330–350 mμ are obtained if there are basifying substituents in the 5- and/or 4'-position. The molar absorption in the region of 300 mμ is promoted by possibly further substituted alkyl substituents in the 3'-position.

Examples of basifying substituents are alkoxy groups such as the methoxy, isopropoxy, cyclohexyloxy and benzyloxy groups; examples of acidifying substitutents are alkylsulphonyl groups such as the methyl and ethyl sulphonyl groups, sulphonic acid amide groups such as the sulphonic acid methyl, butyl and cyclohexyl amide groups as well as the carboxyl groups and its esters or amides.

If Y is a divalent aliphatic radical it is preferably an alkylene radical such as the methylene, 1,1- or 1,2-ethylene, 1,1-, 1,2- or 1,3-propylene, 1,1-, 1,2-, 1,3-, 1,4- or 2,3-butylene radical, and also an alkylene radical interrupted by hetero atoms such as, e.g. the β,β'-diethylene ether radical. If it is an araliphatic radical then it is, e.g. a benzylene radical —C$_6$H$_4$CH$_2$— or a phenethylene radical —C$_6$H$_4$CH$_2$CH$_2$—.

If Y is an aromatic radical then it is mainly an arylene radical of the benzene series, e.g. the 1,2-, 1,3- or 1,4-phenylene radical.

Among the compounds of Formula II the ones are prefered in which Y stands for an alkylene group with 1–4 carbon atoms such as the methylene, 1,2-ethylene or 1,4-butylene group, a phenylene group such as the 1,2- or 1,4-phenylene group, an aralkylene group such as the α,2-benzylene group or an alkylene group including a sulphur atom and containing 4 to 6 carbon atoms such as the —CH$_2$CH$_2$CH$_2$—S—CH$_2$— or

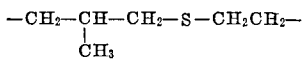

group.

When R, R' and R'' are each an aliphatic radical then they are, e.g. an alkyl radical, for example the methyl, ethyl, propyl, isopropyl, n-, sec. or tert. butyl-, amyl-, hexyl-, octyl-, decyl-, dodecyl-, tetradecyl-, hexadecyl- or octadecyl-radical. If they are a cycloaliphatic radical then they are, e.g. a cyclohexyl radical, and when they are an araliphatic radical, this is, e.g. the benzyl radical. Examples of aromatic radicals symbolised by R' or R'' are the phenyl or the 2-, 3- or 4-methylphenyl or 2-, 3-, or 4-chlorophenyl radicals.

The azobenzene compounds useable as starting materials of Formula I wherein Q is the nitro group are obtained, for example, by coupling an o-nitrobenzene diazonium compound with a 3-unsubstituted phenol coupling in the 2-position to the hydroxyl group, the components being so chosen that the azobenzene compound formed contains the group $\{(X)_{n-1}-Y-W\}$ at least once.

The ring of the o-nitroazobenzene compound is closed to form the triazole of Formula II by the usual methods, e.g. with zinc dust in an alkaline medium.

Starting materials of Formula I wherein Q is the primary amino group are obtained, for example, by coupling a 2-hydroxy-, 2-alkoxy-, or 2-acyloxy-benzene diazonium compound with an aminobenzene coupling in the 2-position to the amino group, the components in this case too being so chosen that the azobenzene compound formed contains the group $\{(X)_{n-1}-Y-W\}$ at least once, and then, if necessary, dealkylating the alkoxy group or saponifying the acyloxy group.

The o-aminobenzene compound is oxidised to form the triazole of the Formula II by the usual methods, for example with Cu-(II)-salts in aqueous/alkaline medium.

Ether groups are dealkylated preferably with hydrogen bromide in glacial acetic acid, and acyloxy groups are hydrolised in aqueous/acid or aqueous/alkaline medium.

A modification of the process for the production of 2-(2'-hydroxyphenyl)-benztriazole compounds which possibly contain esterified carboxyl groups in an alkoxy and/or in an alkylthio radical consists in reacting a 6'-unsubstituted 2-(2'-hydroxyphenyl)-benztriazole compounds containing at least one other hydroxyl group in the nucleus which can be etherified and/or at least one mercapto group which can be etherified, with an organic compound containing possibly esterified carboxyl groups and mobile halogen, for example, with chloroacetic acid or β-carboethoxy-propionyl chloride.

The reaction is performed by the usual methods, for example by heating in an organic solvent, possibly in the presence of an agent which splits off acid, e.g. an alkali metal salt of a low fatty acid such as sodium acetate.

Another modification of the process for the production of 2-(2'-hydroxyphenyl)-benztriazole compounds containing possibly esterified carboxyl groups in an alkoxy and/or alkylthio radical, consists in adding to a 6'-unsubstituted 2-(2'-hydroxyphenyl)-benztriazole compound containing at least one other reactive hydroxyl group in the nucleus and/or at least an etherifiable mercapto group, a reactive organic compound which contains possibly esterified carboxyl groups or which, on the addition, liberates such groups, for example acrylonitrile and succinic acid anhydride, the latter being useful for reaction with hydroxyl groups only.

The addition is performed by the usual methods such as heating the two reaction components, advantageously in an organic solvent, possibly in the presence of polymerisation inhibitors, e.g. methylene blue or 2,6-di-tert. butyl-4-methylphenol.

A further modification of the process consists in reacting a 2-(2'-hydroxyphenyl)-benztriazole compound having a substitutent containing mobile halogen such as, e.g. the carboxylic acid or sulphonic acid chloride group, with a compound containing a condensable group such as, e.g. amino or hydroxyl group, which compound also contains at least one possibly modified carboxyl group. Examples of such condensable compounds are amino and hydroxy carboxylic acids as well as derivatives thereof such as glycine, β-hydroxypropionitrile, glycolic acid ethyl ester and p-aminobenzoic acid isopropylamide.

The condensation is performed by the usual methods, e.g. by heating the two components in the presence of acid binding agents such as tertiary nitrogen bases and in the presence of salts of weak acids, e.g. pyridine, sodium carbonate, calcium carbonate or potassium acetate, possibly in an organic solvent such as acetone or chlorobenzene.

Another modification of the process consists in adding to a 2-(2'-hydroxyphenyl)-benztriazole compound having a substituent containing at least one group capable of addition, a compound containing mobile hydrogen which compound also contains at least one possibly modified carboxyl group. Examples of such groups capable of addition are in particular vinyl or vinylene groups activated by vicinal acidifying group such as the sulphonyl, carbonyl or nitrile group such as the acryloyl group but also heterocyclic esters or amides such as lactones or lactams, e.g. the β-propiolactone group and cyclic anhydrides such as the succinic acid anhydride group. Examples of carboxylated compounds containing mobile hydrogen in the form of hydroxyl mercapto and amino groups are aminocarboxylic acids, hydroxycarboxylic acids and mercapto carboxylic acids and derivatives thereof having a modified carboxyl group such as β-thiopropionic acid, alanine ethyl ester and β-hydroxypropionitrile. Also suitable for addition to vinyl and vinylide groups are sulphinic acids containing carboxyl groups and hydrocyanic acid.

The addition is performed by the usual methods, for example by heating the two components in organic solvents such as chlorobenzene, ethylene glycol dimethyl ether, possibly in the presence of catalysts, e.g. acids such as sulphuric acid, H-form of ion exchangers and hydrofluoboric acid in the case of lactones or basic catalysts such as triethylamine or sodium tert. butylate in the case of activated ethylenes, or catalysts yielding free radicals, such as benzoylperoxide, which are used to catalyze the addition of mercaptans containing carboxyl groups to olefins.

The carboxyl, carboxylic acid ester, carboxylic acid amide and nitrile groups contained in compounds of Formulae I and II, symbolised by W, can be converted into each other by reactions known per se. Thus, for example, carboxyl groups are esterified, possibly by way of their halide, with alcohol or alkali alcoholates, carboxylic acid halide or carboxylic acid ester groups are amidified with primary or secondary amines or nitrile groups are esterified by way of their iminoether groups with alkali alcoholates. Carboxylic acid ester groups of higher alcohols are introduced advantageously by such a subsequent modification of the carboxyl or nitrile group or ester groups of lower alkanols.

Depending on their substitution, the new substituted 2-(2'-hydroxyphenyl)-benztriazole compounds of Formula II are colourless to pale yellowish coloured. Those which absorb the greatest amount of UV light are particularly valuable. Compared with previously known compounds of similar constitution they have improved properties for technical application such as, e.g. solubility, range of action and improved fastness to sublimation. They are incorporated into light-sensitive carriers in amounts of 0.001–5%, in particular in amounts of 0.01–1%, calculated on the carrier.

Free carboxylic acids are useful, especially in form of their salts with aliphatic amines such as diethanolamine or triethanolamine for the stabilization of aqueous or alcoholic solutions of light-sensitive materials such as cosmetic products. Carboxylic acid esters especially those of higher alkanols such as the octyl and dodecyl esters are useful for the stabilization of nonpolar polymers such as polyethylene and polypropylene. Nitriles, carboxylic acid amides as well as esters of lower alkanols are useful for the stabilization of carriers of intermediate polarity. More particularly, compounds of the formula

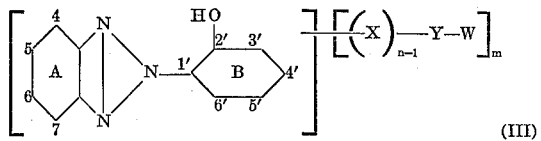

(III)

the molecular weight of which compounds does not exceed 600, and in the formula of which X is a member selected from the group consisting of —O—, —S—, —SO$_2$O—, —COO—, SO$_2$—, —SO$_2$NH—, —CONH—,

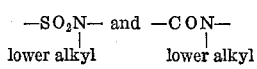

wherein said X is bound only by one of the oxygen, carbon and sulfur atoms contained in said X to at most one of the nuclei A and B, Y is a member selected from the group consisting of alkylene with 1 to 4 carbon atoms, lower alkyl-S-lower alkyl having a total of from 4 to 6 carbon atoms, and

W is a member selected from the group consisting of —COO.alkyl wherein the alkyl moiety is alkyl of 1 to 18 carbon atoms, —COO.cycloalkyl wherein the cyclo alkyl moiety is cycloalkyl of 4 to 12 carbon atoms —COO—benzyl, —COO—phenyl

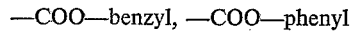

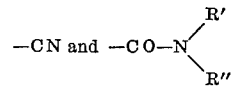

R' being selected from among hydrogen and lower alkyl, and R" being selected from among alkyl of from 1 to 18 carbon atoms, cyclohexyl, benzyl and lower alkenyl, or R' and R" taken together with the nitrogen atom to which they are linked, represent morpholino, m and n are each independently of the other, one of the integers 1 and 2, the first $\{(X)_{n-1}$—Y—W] grouping being linked in one of the positions 5 at ring A, or 3', 4' or 5' at ring B, and a second grouping $\{(X)_{n-1}$—Y—W], if present, being linked to one of the aforesaid positions at that ring, of rings A and B, which is free from said first grouping, nucleus A is substituted in at least one of the 4, 5 and 6 positions which is free from said grouping $\{(X)_{n-1}$—Y—W]

by at least one member selected from the group consisting of hydrogen, lower alkyl, lower alkoxy, alkoxy-carbonyl of from 2 to 19 carbon atoms, cyclohexyloxycarbonyl, benzyloxycarbonyl, phenoxycarbonyl, N-alkyl-substituted carbamyl and N-alkyl-susbituted sulfamyl, each alkyl in the last two members having from 1 to 18 carbon atoms, and the total of carbon atoms in alkyl substituents of each of said members not exceeding 20, N-cyclohexyl-sulfamyl, N-benzylsulfamyl, N-lower alkoxy-lower alkyl-sulfamyl, N-hydroxy-lower alkyl-sulfamyl, lower alkyl-sulfonyl and halogen, and the nucleus B is substituted in at least one of the 3'- 4'- and 5'-positions, not substituted by said grouping $\{(X)_{n-1}$—Y—W], by a member selected from the group consisting of hydrogen, lower alkyl, cyclo alkyl of from 5 to 6 ring carbon atoms, chlorine, benzyl or phenyl, are useful as UV-absorbers particularly in polymers of low to medium polarity, such as cellulose acetate, poly-methyl-methacrylate, polystyrene, and related polymers. In contrast to known benzotriazole derivatives used as UV-absorbers, the novel compounds of Formula III are especially valuable due to their good compability with the last-mentioned polymeric materials, which allows the build up of thin and nevertheless UV-dense structures.

Among the compounds falling under Formula III, those of the formula

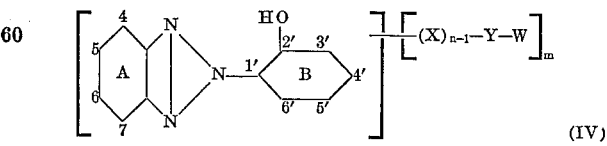

(IV)

the molecular weight of which compounds does not exceed 600, and in the formula of which X is a member selected from the group consisting of —O—, —S—, —SO$_2$O—, —COO—, —SO$_2$—

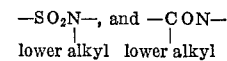

wherein said X is bound only by one of the oxygen, carbon and sulfur atoms contained in said X to at most one of the nuclei A and B, Y has the same meaning as in Formula III, W is a member selected from the group consisting of —COO.alkyl wherein the alkyl moiety is alkyl of 4 to 18 carbon atoms, —COO.cycloalkyl wherein the cyclo alkyl moiety is cycloalkyl of 4 to 12 carbon atoms and —COO—benzyl, $m$ and $n$ are each independently of the other, one of the integers 1 and 2, the first and second groupings $\{(X)_{n-1}—Y—W\}$ being linked to rings A and B, respectively, in the same manner as in the compounds of Formula III, nucleus A is substituted in at least one of the 4, 5 and 6 positions which is free from said grouping $\{(X)_{n-1}—Y—W\}$, by at least one member selected from the group consisting of hydrogen, lower alkyl, lower alkoxy, alkoxy-carbonyl of from 2 to 19 carbon atoms, cyclohexyloxycarbonyl, benzyloxycarbonyl, phenoxycarbonyl, N-(mono-higher alkyl)-carbamyl and N-(mono-higher alkyl)-sulfamyl, higher alkyl in the last two members having from 4 to 18 carbon atoms, N,N-di-alkyl-carbamyl, N,N-di-alkyl-sulfamyl, the total number of carbon atoms in both alkyl substituents of each of the two last-mentioned members not exceeding 20, N-cyclohexyl-sulfamyl, N-benzylsulfamyl, N-lower alkoxy-lower alkyl-sulfamyl, N-hydroxy-lower alkyl-sufamyl, lower alkyl-sulfonyl and halogen, and the nucleus B is substituted in the same manner as in compounds of Formula III, are useful as UV-absorbers particularly in poly-α-olefines such as polyethylene and polypropylene materials, be it as plates, sheets, foils or fiber materials.

A further subclass of compounds falling under Formula II are compounds of the formula

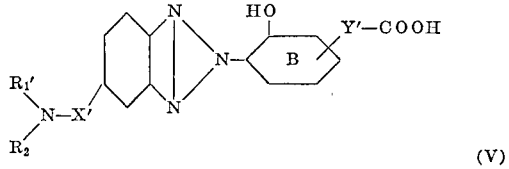

(V)

wherein X' represents a member selected from the group consisting of —CO— and —SO₂—, each of $R_1'$ and $R_2'$ represents hydrogen, lower alkyl, hydroxy-lower alkyl or lower alkoxy-lower alkyl, or $R_1'$ and $R_2'$ taken together with the nitrogen atom to which they are linked represent morpholino, Y' represents lower alkylene attached to the 5'-position of ring B, or butylene or benzylene attached to the 3'-position of ring B, and ring B is further substituted, apart from the grouping —Y'—COOH, by a member selected from the group consisting of hydrogen and lower alkyl, which compounds as well as their salts which are soluble or homogeneously distributable in aqueous or alcoholic media, are useful particularly as UV-absorbers in alcoholic or aqueous solutions, lotions and dispersions required in the cosmetic industry.

Finally, compounds of the formula

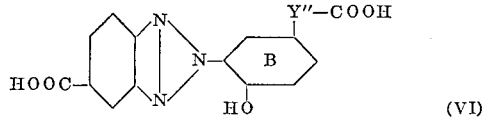

(VI)

wherein Y" represents lower alkylene, and ring B is further substituted by hydrogen or lower alkyl, preferably in the form of their soluble salts, have usefulness in the same manner as the compounds of Formula V and the above-defined salts of the latter compounds.

The principal carriers for the new compounds of Formula II are polymers, chiefly completely synthetic polymers e.g. addition polymers, in particular polymers of ethylenically unsaturated monomers such as, e.g. polyvinyl chloride, polyvinylidene chloride, styrene polymers, diene polymers as well as their copolymers, polyethylene, polypropylene, polyacryl compounds, in particular polymethylmethycrylate or polyacrylonitrile, also condensation polymers such as polyesters, e.g. polyethylene glycol terephthalates, or polyamides e.g. polycaprolactam, or also mixed polymers such as, e.g. polyester resins i.e. adddition copolymers of unsaturated polyesters with ethylenically unsaturated monomers such as styrene and methylmethacrylate, also natural polymers or synthetic modifications thereof such as, e.g. cellulose, cellulose esters and ethers and proteins.

The molecular weight of the polymers mentioned above plays a subsidiary part as long as it remains within the margins necessary for the characteristic mechanical properties of the polymers concerned. Depending on the polymer, it can be between 1000 and several millions. The new substituted 2-(2'-hydroxyphenyl)-benztriazole compounds are incorporated into these polymers—depending on the type of polymer—e.g. by working in at least one of these compounds and possibly other additives such as, e.g. plasticisers, antioxidants, heat stabilisers and pigments, into the melts by the methods usual in the industry before or during moulding, or by dissolving them in the corresponding monomers before polymerisation provided they do not take part in the polymerisation, or by dissolving the polymers and the additives in solvents and subsequently evaporating off the latter. The new substituted 2-(2'-hydroxyphenyl)-benztriazole compounds can also be drawn from baths, e.g. from aqueous dispersions, onto films or threads, or can be added directly to the liquid containing dissolved therein the substrates to be protected in form of their neutral solution in water or alcohols.

As the compositions according to the invention comprise only physical mixtures of the substituted benztriazole compounds and the light-sensitive organic material benztriazole compounds containing a carboxy group or an equivalently reacting derivative thereof should not be admixed with condensation monomers prior to polycondensation nor should they be admixed with preformed polycondensates under conditions which would cause the chemical introduction of said benztriazole compounds into the polymeric chain.

The light-sensitive materials can also be protected from the injurious effect of light by painting them with protective coating, e.g. a lacquer, containing at least one compound of Formula I as defined, or by covering them with covers—preferably film-like—containing such actinic agents. In these two cases, the amount of the actinic agents to be added is advantageously 10–30% (calculated on the protective coating material), for coatings of less than 0.01 mm. thickness, and 1–10% for protective coatings of 0.01–0.1 mm. thickness. The more colourlesss the actinic agents are, the more valuable they are, as they then do not lend a yellow colouring to the end products.

In non-polar polymers, those benztriazole compounds are particularly suitable which themselves contain as few polar groups as possible such as secondary carboxylic acid or sulphonic acid amide groupings. In this case, generally products having a low melting point are preferred because of their solubility.

In general, it is recommended that the possible use of a specific product be estimated by solubility trials. For example, if the product is difficultly soluble, even hot, in the solvents known for the polymers to be protected, then unfavourable results in this polymer are to be expected.

For certain uses, particularly when warm chips of polymers are powdered with protective substances, the products which melt above the temperature at which the polymers concerned melt and, in spite of this, are sufficiently soluble in the melted polymers, are particularly valuable.

Especially valuable light stabilizers according to the invention, due to their ease of preparation as well as to their solubility in non-polar solvents and carriers are those in which $m$ equals 1, $n$ equals 1, Y is an alkylene group of 1 to 4 carbon atoms or an aralkylene group of 7 to 8 carbon atoms. As an aralkylene group

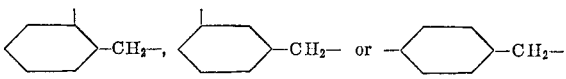

are especially good. W is a —COOE wherein E is alkyl, cycloalkyl or benzyl wherein the alkyl contains preferably 4 to 12 carbon atoms and the cycloalkyl contains 5 to 7 carbon atoms. The nucleus A is substituted at all the 4-, 5- and 6-positions by hydrogen or at the 4- and 6-positions by hydrogen and at the 5-position by chlorine, methyl, methoxy or —COOE′ in which E′ must be the same radical as is found for E (in other words when A is substituted by —COOE′, the resulting compound is a diester derived from a dicarboxylic acid in which both carboxyl groups are esterified with the same alcohol. In said diesters the alkyl groups represented by E contain preferably one to 8 carbon atoms). The nucleus B is substituted in the 3′-, 4′- or 5′- positions, preferably at the 3′- or 5′-position by —Y—W and in the remaining of said positions by hydrogen or hydrogen and methyl or hydrogen and chlorine.

The light sensitive carriers can cover a wide range of organic materials. Cosmetic products containing fats, oils and/or fatty acid organic soaps especially soaps of long chain unsaturated acids, are useable. Especially suitable are cellulose esters, addition polymers of ethylenically unsaturated monomers, e.g. polyethylene, polypropylene, polyvinylchloride, polymethylmethacrylate, copolymers of unsaturated polymeric condensates and ethylenically unsaturated monomers. However the carrier is by no means intended to be limited to these latter polymeric materials as is evidenced by Col. 5 of the specification.

The following examples illustrate the invention. Where not otherwise stated, parts are given therein as parts by weight. The temperatures are in degrees centigrade. The relationship of parts by weight to parts by volume is as that of kilograms to liters.

EXAMPLE 1

The still moist azo dyestuff obtained by coupling 26.1 parts of diazotised 3-nitro-4-aminobenzene sulphonic acid-β-hydroxyethylamide and 18.0 parts of β-(3-methyl-4-hydroxyphenyl)-propionic acid, is stirred with 200 parts by volume of 2 N sodium hydroxide solution. (The β-(3-methyl-4-hydroxyphenyl)-propionic acid is obtained by saponifying the addition product of acrylonitrile and o-cresol.) 30 parts of zinc dust are added to the solution obtained and then 50 parts by volume of concentrated sodium hydroxide solution are added dropwise within 1 hour, the temperature being kept under 45°. The solution, which is now yellow, is acidified with concentrated hydrochloric acid while cooling until congo red paper is turned slightly blue. The precipitate which forms is filtered off under suction, washed well with water, then stirred with dilute sodium carbonate solution and filtered. On acidifying the filtrate, 2-(2′-hydroxy-3′-methyl - 5′ - β - carboxyethylphenyl)-benztriazole-5-sulphonic acid-β - hydroxyethylamide is obtained.

From methyl ethyl ketone/o-dichlorobenzene the product crystallises in practically colourless crystals melting at 174°. The yellow melt recrystallises and melts then at 194°. From dilute alcohol the form melting at 194° crystallises directly in yellowish needles.

When repeating Example 1, but using in lieu of 18.0 parts of β-(3-methyl-4-hydroxyphenyl)-propionic acid an equivalent amount of β-(3-methyl - 4 - hydroxyphenyl)-propionitrile and otherwise repeating the same procedure as in the example, the compolnd 2-[2′-hydroxy-3′-methyl-5-′(β-cyanoethyl)-phenyl]-benzotriazole-5 - sulfonic acid-β-hydroxyethyl amide is obtained.

When repeating Example 1, but using an equivalent amount of o-nitraniline instead of 26.1 parts of 3-nitro-4-aminobenzene sulfonic acid-β-hydroxyethylamide, and an equivalent amount of β-(p-hydroxyphenyl)-propionitrile in lieu of 18.0 parts of β-(3-methyl-4-hydroxyphenyl)-propionic acid, there is obtained 2-[2′-hydroxy - 5′ - (β-cyanoethyl)-phenyl]-benzotriazole.

When repeating Example 1, but using an equivalent amount of 4-amino-3-nitrobenzene carboxylic acid instead of 26.1 parts of 3-nitro-4-aminobenzene sulfonic acid-β-hydroxyethylamide and otherwise repeating the same procedure as in the example, the compound 2-(2′-hydroxy-3′-methyl-5′-carboxyethylphenyl)-benzotriazole-5-carboxylic acid is obtained.

Analogous procedure using the corresponding 4-amino-3-nitrobenzenesulphonic acid amides yields the following compounds:

2-(2′-hydroxy-3′-methyl-5′-β-carboxyethylphenyl)-
 benztriazole-5-sulfonic acid butylamide
2-(2′-hydroxy-3′-methyl-5′-β-carboxyethylphenyl)-
 benztriazole-5-sulfonic acid cyclohexylamide
2-(2′-hydroxy-3′-methyl-5′-β-carboxyethylphenyl)-
 benztriazole-5-sulfonic acid diethylamide
2-(2′-hydroxy-3′-methyl-5′-β-carboxyethylphenyl)-
 benztriazole-5-sulfonic acid-δ-methoxypropylamide
2-(2′-hydroxy-3′-methyl-5′-β-carboxyethylphenyl)-
 benztriazole-5-sulfonic acid benzylamide.

EXAMPLE 2

The still moist dyestuff, obtained by coupling 13.8 parts of diazotised o-nitraniline and 24.2 parts of 2-hydroxy-2′-carboxyl-5-methyl-1,1′-diphenylmethane, is dissolved in 400 parts by volume of water and 100 parts by volume of concentrated sodium hydroxide solution. After the addition of 40 parts of zinc dust, 50 parts by volume of concentrated ammonia are added dropwise whereupon the colour quickly changes from red-violet to yellow-green. The mixture is stirred for another hour at 80° and then poured into a solution of 300 parts by volume of concentrated hydrochloric acid in 1000 parts by volume of water. The precipitated 2-[2′-hydroxy-3′ - (o - carboxyphenylmethyl)-5′ - methylphenyl] - benztriazole is purified by recrystallisation from glacial acetic acid/chlorobenzene. M.P. 210°.

2 - [2′-hydroxy-3′-(o-carboxyphenylmethyl)-5′-chlorophenyl]-benztriazole is obtained in an analogous manner on using 2 - hydroxy-2′-carboxy-5-chloro-1,1′-diphenylmethane instead of the 2-hydroxy-2′-carboxy-5-methyl-1,1′-diphenylmethane mentioned. The diphenylmethane compounds employed are obtained by reduction from the corresponding benzophenone derivatives with zinc dust in alkaline medium.

EXAMPLE 3

The still moist azo dyestuff, obtained by coupling 55.5 parts of diazotised 3-nitro-4-aminobenzene sulphonic acid carboxymethylamide, and 21.6 parts of p-cresol is dissolved in 400 parts by volume of 2 N sodium hydroxide solution. (The 3 - nitro - 4-aminobenzene sulphonic acid carboxymethylamide is obtained by reaction of 3-nitro-4-chlorobenzene sulphonic acid chloride with glycine in a weakly alkaline medium at room temperature and subsequent reaction with ammonia at 130°.) 50 parts of zinc dust are added, the temperature being kept at 35–40°. To complete the decolouration, 40 parts by volume of concentrated sodium hydroxide solution are added and the mixture is stirred for 1 hour. The 2-(2′-hydroxy-5′-methylphenyl)-benztriazole - 5-sulphonic acid carboxymethylamide is precipitated by the addition of concentrated hydrochloric acid until the reaction is acid to congo paper. It is purified by dissolving in sodium carbonate solution, filtration, again precipitating followed by recrystallisation from dimethylformamide/glacial acetic acid. The compound decomposes at around 250°.

If instead of the 21.6 parts of p-cresol, 36 parts of β-(3-methyl-4-hydroxyphenyl)-propionic acid are used, then 2-(2′ - hydroxy - 3′-methyl-5′-β-carboxyethylphenyl)-benztriazole-5-sulphonic acid carboxymethylamide is obtained.

EXAMPLE 4

10 parts of 2 - (2′ - hydroxy - 5′-β-carboxyethylphenyl)-benztriazole, obtained by using β-p-hydroxyphenyl-propionic acid and o-nitraniline as described in Example 1, and 100 parts by volume of toluene, 20 parts by volume of butanol and 0.5 part of p-toluene sulphonic acid chloride are heated in a water separator until, over a period of 3 hours, no more water is separated. After washing with 2% sodium carbonate solution and evaporation off the solvent, 2-(2′-hydroxy-5′-β-carbobutoxyethylphenyl)-benztriazole is obtained. M.P. 92°. (Recrystallised from ligroin B.P. 100–140°.)

On using the corresponding alcohols, 2-(2′-hydroxy-5′-β-carbodecyloxy-ethylphenyl)-benztriazole, 2 - (2′ - hydroxy - 5′ - β-carbo-β′-ethylhexyloxy-ethylphenyl)-benztriazole, 2 - (2′ - hydroxy-5′-β-carbocyclohexyloxy-ethylphenyl)-benztriazole are obtained by the same process.

The analogous ethyl ester is obtained by normal Fischer esterification in ethanol.

EXAMPLE 5

28.3 parts of 2-(2′-hydroxy-5′-β-carboxyethylphenyl)-benztriazole are dissolved in 300 parts by volume of dry dimethylformamide. 14.0 parts of thionyl chloride are added dropwise to this solution whereupon the temperature is raised to 50–60°. After standing for 15 minutes at this temperature, the excess thionyl chloride is drawn off under vacuum and 20.0 parts of cyclohexylamine are added to the resultant solution of the acid chloride in such a way that the temperature does not rise above 30°. The mixture is then slowly heated in a water bath and kept for 1 hour in a boiling water bath. After cooling, the mixture is made acid to congo paper with dilute hydrochloric acid, the 2-(2′-hydroxy-5′-β-carbocyclohexylamidoethylphenyl)-benztriazole is filtered off under suction and recrystallised from dimethylformamide/glacial acetic acid. M.P. 235°.

On using the corresponding amines, 2-(2′-hydroxy-5′-β-carbobutylamidoethylphenyl)-benztriazole, 2 - (2′ - hydroxy-5′ - β - carbobenzylamidoethylphenyl)-benztriazole, 2-(2′-hydroxy-5′-β-carboallylamidoethylphenyl) - benztriazole are obtained.

The 2-(2′-hydroxy-5′-carboxyethylphenyl)benztriazole can be obtained by reducing the monoazo dyestuff obtained from diazotised o-nitraniline→p-hydroxyhydrocinnamic acid.

EXAMPLE 6

The still moist azo dyestuff, obtained by coupling 26.3 parts of diazotised o-tosyloxy-aniline and 18.1 parts of 3-carboxymethoxy-4-methylaniline in glacial acetic acid solution, is dissolved in 100 parts by volume of pyridine and 100 parts by volume of water. A sodium hypochlorite solution (produced by introducing 17.7 parts of chlorine gas into 100 parts by volume of 2.5 N ice cold sodium hydroxide solution) is added at 20° and the whole is stirred for 24 hours. 10 parts of solid sodium hydroxide are then added, the pyridine is distilled off and the aqueous solution is refluxed for another 2 hours. On acidifying, the 2-(2′-hydroxyphenyl)-5-carboxymethoxy-6-methylbenztriazole precipitates and is filtered off under suction.

The same product is obtained if 2-phenyl-2′,5-dihydroxy-6-methyl-benztriazole is partially alkylated with the sodium salt of chloroacetic acid. The former compound is obtained by coupling diazotised o-methoxyaniline and 3-methoxy-4-methyl aniline in an alkaline solution, oxidising with copper-(II)-salts and demethylating.

EXAMPLE 7

27.1 parts of 2-(2′-hydroxy-3′,5′-dimethylphenyl)-5-mercapto-benztriazole (M.P. 128°) in 300 parts by volume of dioxan are refluxed for 4 hours in an atmosphere of nitrogen with 10 parts of acrylic acid ethyl ester and 5 parts of triethylamine. The solvent is then distilled off under vacuum and the residue is crystallised from ligroin. 28 parts of 2-(2′-hydroxy-3′,5′-dimethylphenyl)-5-β-carboethoxyethylmercapto-benztriazole are obtained. M.P. 87°.

The 2 - (2′-hydroxy-3′,5′-dimethylphenyl)-5-mercapto-benztriazole used as starting material is obtained from 2-(2′ - hydroxy - 3′,5′ - dimethylphenyl) - benztriazole - 5-sulphonic acid chloride by reduction with zinc dust and hydrochloric acid in glacial acetic acid. This sulphonic acid chloride is produced by the usual methods from the corresponding sulphonic acid which is obtained by reduction of the monoazo dyestuff produced from diazotised o-nitraniline-p-sulphonic acid→2,4-dimethylphenol. If the 2-(2′ - hydroxy - 3′,5′ - dimethylphenyl) - benztriazole - 5-sulphonic acid chloride is reduced by means of sodium sulphite into the sulphinic acid and if the latter is reacted as described above with acrylonitrile, then 2-(2′-hydroxy-3′,5′-dimethylphenyl)-5-β-cyanoethyl sulphonyl benztriazole is obtained.

EXAMPLE 8

22.7 parts of 2-(2′,4′-dihydroxyphenyl)-benztriazole in 50 parts by volume of chlorobenzene are refluxed for 3 hours with 10.0 parts of succinic acid anhydride and 0.3 part of toluene sulphonic acid chloride. After cooling, the 2 - (2′ - hydroxy - 4′ - β - carboxypropionyloxy - phenyl)-benztriazole is obtained. 2-(2′,4′-dihydroxyphenyl)-benztriazole is obtained by reducing the monoazo dyestuff obtained from diazotised o-nitraniline and resorcin.

EXAMPLE 9

A suspension of 28.8 parts of 2-(2′-hydroxy-5′-methylphenyl)-benztriazole-5-carboxylic acid chloride in 100 parts by volume of dioxane is added dropwise at room temperature to a solution of 22.0 parts of glycine ethyl ester in 200 parts by volume of pyridine. The mixture is stirred for 2 hours at room temperature and then heated to 50°. After cooling, the reaction mixture is poured into 2000 parts by volume of ice cold 2 N hydrochloric acid and the 2-(2′-hydroxy-5′-methylphenyl)-benztriazole-5-carboxylic acid carboethoxymethylamide obtained is filtered off under suction.

Analogously 2 - (2′-hydroxy-5′-methylphenyl)-benztriazole - 5 - carboxylic acid - N-methyl-carboethoxymethylamide is obtained when the ethylester of sarcosine is used instead of the glycine ethylester. For the preparation of 2-(2′ - hydroxy - 5′ - methylphenyl) - benzotriazole - 5-carboxylic acid-p-carbomethoxyphenylester the corresponding benzotriazole 5-carboxylic acid chloride is reacted with p-hydroxybenzoic acid methylester at around 90°. 2-(2′-hydroxy-5′-methylphenyl)-benzotriazole-5-carboxylic acid chloride is obtained by reacting the corresponding carboxylic acid with thionyl chloride. The latter is obtained by reducing the monoazo dyestuff produced from diazotized 4-amino-3-nitrobenzoic acid→p-cresol.

2 - (2′ - hydroxy - 5′ - methylphenyl) - 5 - [carbo - β-(β′ - carbethoxy - ethyl) - mercapto - ethoxy] - benzotriazole is obtained from the corresponding benzotriazole 5-carboxylic acid chloride by condensation with β-(β′-ethoxycarbonyl-ethyl-mercapto)-ethanol under reflux.

EXAMPLE 10

33.7 parts of 2-(2′-hydroxy-3′,5′-dimethylphenyl)-benzotriazole-5-sulfonic acid chloride (compare Example 7) suspended in 100 parts by volume of chlorobenzene are slowly added at 50° to a solution of 50 parts of p-hydroxy benzoic acid methyl ester in 100 parts by volume of chloro-benzene and 12 parts of dimethyl aniline and then the mixture is heated for 2 hours on a boiling water bath. The mixture is then covered, when ice cold, with a solution of 150 parts by volume of 2 N sodium hydroxide solution in 200 parts by volume of ethanol and, after well shaking, the aqueous-alcoholic phase is isolated. Careful acidification in the cold with 5 N-hydrochloric acid, produces 2-(2′-hydroxy-3′,5′-dimethylphenyl)-benzotriazole-5-sulfonic acid-p-carbomethoxyphenyl ester.

EXAMPLE 11

36.5 parts of 2-(2′-hydroxy-5′-tert. butylphenyl)-benztriazole-5-sulphonic acid chloride (produced analogously to Example 7) suspended in 100 parts of dioxane are added at room temperature to a solution of 20 parts of glycine in 200 parts of pyridine and 30 parts of triethylamine. After standing four 4 hours at room temperature, the mixture is poured, while cooling, into 5000 parts by volume of 2 N hydrochloric acid whereupon the 2-(2'-hydroxy-5'-tert. butylphenyl)-benztriazole-5-sulphonic acid-carboxymethylamide precipitates. Recrystallised from alcohol, it melts at 179°.

If instead of the 2-(2'-hydroxy-5'-tert. butylphenyl)-benztriazole-5-sulphonic acid chloride, an equivalent amount of 2-(2'-hydroxy-5'-cyclohexylphenyl)-benztriazole-5-sulphonic acid chloride, 2-(2'-hydroxy-5'-benzylphenyl)-benztriazole-5-sulphonic acid chloride or 2-(2'-hydroxy-5'-phenylphenyl)-benztriazole-5 - sulphonic acid chloride is used, then 2-(2'-hydroxy-5'-cyclohexylphenyl)-benztriazole-5-sulphonic acid-carboxymethylamide, or 2-(2' - hydroxy - 5' - benzylphenyl) - benztriazole - 5 - sulphonic acid carboxymethylamide or 2-(2'-hydroxy-5'-phenylphenyl)-benztriazole - 5 - sulphonic acid carboxymethylamide respectievly is obtained.

EXAMPLE 12

The still moist azo dyestuff (obtained by coupling 13.8 parts of diazotised o-nitraniline with 21.4 parts of 4-hydroxy-4'-carboxydiphenyl), is dissolved with 20 parts of sodium hydroxide in 200 parts by volume of water. The solution is then reduced at 40–50° until decolouration occurs by the addition of zinc dust and the whole is stirred for 12 hours at room temperature. The reaction mixture is acidified with excess hydrochloric acid, the precipitate is filtered off under suction and crystallised from a mixture of dimethylformamide/glacial acetic acid 2-[2'-hydroxy-5'-4''-carboxyphenyl)-phenyl]-benztriazole which melts above 280° is obtained.

EXAMPLE 13

27.9 parts of 2-(2'-hydroxy-3'-β-methylallyl-5'-methylphenyl)-benztriazole (M.P. 94°, obtained by Claisen rearrangement of the ether obtained from 2-(2'-hydroxy-5'-methylphenyl)-benztriazole and methallyl chloride), 12 parts by volume of an 80% aqueous solution of thioglycolic acid and 0.2 part of benzoyl peroxide in 200 parts by volume of glacial acetic acid are refluxed for 12 hours. The acetic acid solution is diluted, while still hot, with water, the precipitate formed is filtered off under suction and dissolved in 2 N sodium hydroxide solution. The yellow, alkaline solution is filtered and acidified with 2 N hydrochloric acid. The precipitate formed is filtered off under suction, washed with water and crystallised from ligroin. 2 - (2'-hydroxy-3'-β-methyl-γ-carboxymethylmercapto-propyl-5'-methylphenyl)-benztriazole which melts at 114° is obtained.

If in the above example, instead of 12 parts by volume of an 80% solution of thioglycolic acid, 12 parts of β-thiopropionic acid are used and the procedure given above is followed, then 2 - (2'-hydroxy-3'-β-methyl-γ-carboxyethylmercaptopropyl-5'-methylphenyl)-benztriazole is obtained. M.P. 142°. Esterification of the two acids with ethanol, butanol or octanol yields the following compounds:

2-(2'-hydroxy-3'-β-methyl-δ-(carbethoxymethylmercapto)-propyl-5'-methylphenyl)benztriazole 2-(2'-hydroxy-3'-β-methyl-δ-(carbobutoxymethylmercapto)-propyl-5'-methylphenyl)-benztriazole 2-(2'-hydroxy-3'-β-methyl-δ-(carboocytloxymethylmercapto)-propyl-5'-methylphenyl)-benztriazole 2-[2'-hydroxy-3'-β-methyl-δ-(β'-carbethoxyethylmercapto)-propyl-5'-methylphenyl)-benztriazole 2-[2'-hydroxy-3'-β-methyl-δ-(β'-carbobutoxyethylmercaptopropyl-5'-methylphenyl)-benztriazole 2-[2'-hydroxy-3'-β-methyl-δ(β'-carboocytloxyethylmercapto)-propyl-5'-methylphenyl)-benztriazole 2-[2'-hydroxy-3'-γ-(β'-cyclohexyloxycarbonyl-ethylmercapto)-propyl-5'-methylphenyl]-benztriazole.

EXAMPLE 14

The solution of the β-[3' - benztriazolyl-(2'')-4'-hydroxyphenyl-(1')]-propionic acid chloride as obtained according to Example 5 is heated with excess benzyl alcohol for three hours on a boiling water bath. The excess benzyl alcohol and the dimethyl formamide is removed in vacuo. The 2 - (2' - hydroxy-5'-β-carbobenzyloxyethylphenyl)-benztriazole so obtained is recrystallised from isopropanol and melts at 117°.

Analogously 2 - (2' - hydroxy-5'-β-carbomethyloxyethylphenyl)benztriazole 2-(2'-hydroxy-5'-β-carboallyloxyethylphenyl)-benztriazole 2-(2'-hydroxy-5'-β-carbophenyloxyethylphenyl)-benztriazole.

EXAMPLE 15

15 parts of 2-(2'-hydroxy-3'-methyl-5'-β-carboxyethylphenyl)-5-chlorobenztriazole, 30 parts of dodecyl alcohol and 0.8 part of sulphuric acid are refluxed for three hours at 12 mm. pressure. At the same pressure, the excess alcohol is distilled off and the residue of the distillation is poured onto crushed ice. The 2-(2'-hydroxy-3'-methyl-5'-β-carbododecyloxyethylphenyl) - 5-chlorobenztriazole so obtained is recrystallised from isopropanol and melts at 82°.

The following are prepared analogously:

2-(2'-hydroxy-5'-β-{β'-[β''-(ethoxycarbonyl)-ethylmercapto]-ethoxycarbonyl}-ethyl-phenyl)benzotriazole, 2-(2'-hydroxy-3'-methyl-5'-β-carbododecyloxyethylphenyl)-5-methylbenztriazole, 2-(2'-hydroxy-3'-methyl-5'-β-carbododecyloxyethylphenyl)-4,6-dichlorobenztriazole 2-(2'-hydroxy-3'-methyl-5'-β-carbododecyloxyethylphenyl)-5,6-dimethylbenztriazole, 2-(2'-hydroxy-3'methyl5'-3-carbododecyloxyethylphenyl)-5-methoxybenztriazole, 2-(2'-hydroxy-3'-methyl-5'-β-carbododecyloxyethylphenyl)-5-ethoxybenztriazole.

EXAMPLE 16

15 parts of 2 - (2' - hydroxy-3'-o-carboxyphenylmethyl-5'-methylphenyl)-benztriazole are refluxed for six hours with 30 parts of butanol and 1 part of sulphuric acid. The resultant solution is poured onto 20 parts of ice and 400 parts of water. The 2-(2'-hydroxy-3'-o-carbobutoxyphenylmethyl - 5'-methylphenyl)-benztriazole crystallises upon stirring, is collected by filtration and recrystallised from ethanol. It melts at 73°.

The following esters are prepared in an analogous manner:

2-(2'-hydroxy-3'-o-carbobutoxyphenylmethyl-5'-chlorophenyl)-benztriazole, 2-(2'-hydroxy-3'-o-carbobutoxyphenylmethyl-5'-chlorophenyl)-5-chlorobenztriazole 2-(2'-hydroxy-3'-[o-carbo-β-(β'-carboethoxy-ethylmercapto)-ethoxyphenylmethyl]-5'-methylphenyl)benzotriazole, 2-(2'-hydroxy-3'-δ-carbobutoxybutyl-5'·methylphenyl)-benztriazole 2-(2'-hydroxy-5'-carbobutoxymethylphenyl)-benztriazole

EXAMPLE 17

2 - (2' - hydroxy - 5'-p-carboxyphenylphenyl)-benztriazole is transformed into its acid chloride according to Example 5. The solution in dimethylformamide so obtained is reacted with excess allyl alcohol analogously to Example 14. The resultant 2-(2'-hydroxy-5'-p-carboallyloxyphenylphenyl)-benztriazole is worked up as in Example 14 and is thereupon recrystallised from ethanol. It melts at 138°.

EXAMPLE 18

24.1 parts of 2 - (2'-hydroxy-3'-methyl-5'-β-carboxyethylphenyl)-benztriazole-5-carboxylic acid are suspended in 1 part of dimethylformamide and 100 parts of chlorobenzene. 28 parts of thionyl chloride are added thereto with good stirring. The mixture is slowly heated to reflux temperature and is kept at this temperature until a clear solution is obtained. After an additional quarter of an hour at reflux temperature, 50 parts of chlorobenzene are distilled off whereby some excess thionyl chloride is driven off also. The remaining solution is cooled to 70° whereupon 100 parts of ethanol are added. The resultant mixture is refluxed for 45 minutes. Cooling to 0°, a crystalline product is obtained which is filtered off. Further amounts can be obtained by concentrating the mother liquors. The 2 - (2' - hydroxy-3'-methyl-5'-β-carboethoxyethylphenyl)-5 - carboethoxybenztriazole so obtained is recrystallised from ethanol and melts at 104°.

Reaction with the corresponding alcohols yields the following compounds:

2-(2'-hydroxy-3'-methyl5'-β-carbomethoxyethylphenyl)-5-carbomethoxybenztriazole 2-(2'-hydroxy-3'-methyl-5'-β-carbobutoxyethylphenyl)-5-carbobutoxybenztriazole 2-(2'-hydroxy-3'-methyl-5'-β-carbooctyloxyethylphenyl)-5-carbooctyloxybenztriazole 2-(2'-hydroxy-3'-methyl-5'-β-carbocyclohexyloxyethylphenyl)-5-carbocyclohexyloxybenztriazole 2-(2'-hydroxy-3'-methyl-5'-β-carbobenzyloxyethylphenyl)-5-carbobenzyloxybenztriazole 2-(2'-hydroxy-3'-methyl-5'-β-carbophenoxyethylphenyl)-5-carbophenoxybenztriazole

EXAMPLE 19

34.1 parts of 2-(2'-hydroxy-3'-methyl-5'-β-carboxyethylphenyl)-benztriazole-5-carboxylic acid are transformed into the acid chloride according to Example 18. The solution so obtained is diluted with 100 parts by volume of ligroin while still warm. Thereupon 16 parts of methylamine (in form of a 30% aqueous solution) are added and the mixture is stirred for 30 minutes at reflux. After cooling the mixture is acidified with 20 parts by volume of concentrated hydrochloric acid. The 2-(2'-hydroxy-3'-methyl-5'-β-carbomethylamidoethylphenyl) - benztriazole-5-carboxylic acid methylamide precipitated is recrystallised from dimethylformamide. It melts above 260°.

The following derivatives are prepared analogously 2-(2'-hydroxy-3'-methyl-5'-β-carbocyclohexylamidoethylphenyl)-benztriazole-5-carboxylic acid cyclohexylamide 2-(2'-hydroxy-3'-methyl-5'-β-carbobenzylamidoethylphenyl)-benztriazole-5-carboxylic acid benzylamide.

EXAMPLE 20

34.1 parts of 2-(2'-hydroxy-3'-methyl-5'-β-carboxyethylphenyl)-benztriazole-5-carboxylic acid are transformed into the acid chloride according to Example 18. The solution so obtained is chilled while being stirred. The acid chloride crystallises and is filtered off and washed with ligroin. It is dissolved in 100 parts by volume of methylethylketone to which solution 45 parts of morpholine are added with good stirring. To the thick reaction mixture are added 500 parts of water and 30 parts by volume of concentrated hydrochloric acid. The oil remaining is dissolved in ethanol. Upon dilution with water the 2-(2'-hydroxy - 3' - methyl-5'-β-carbomorpholido-ethylphenyl)-benztriazole-5-carboxylic acid morpholine crystallises.

The following products are obtained in an analogous manner:

2-(2'-hydroxy-3'-methyl-5'-β-carbodimethylamidoethylphenyl)-benztriazole-5-carboxylic acid dimethylamide 2-(2'-hydroxy-3'-methyl-5'-β-carbobutylamidoethylphenyl)-benztriazole-5-carboxylic acid butylamide.

EXAMPLE 21

100 parts of polyethylene powder (DFD 4400, of Union Carbide International Chemical Company, 30 East 42nd St., New York, N.Y. U.S.A.) are mixed with 0.25 part of one of the compounds given below and the mixture is extruded into a foil of about 0.06 mm. thickness. Cuttings from this film, which absorbs UV light, were exposed for 250 hours in a fadeometer. The content of actinic agent in the film was determined before and after exposure spectrophotometrically. The losses so determined are given in Table 1.

TABLE 1

| No. | Compound | Loss[1] |
|---|---|---|
| Comparative compounds without carboxylic acid derivitive group | | |
| 1 | 2-(2'-hydroxy-5'-methylphenyl)-benztriaxole | 72 |
| 2 | 2-(2'-hydroxy-5'-tert. butylphenyl)-benztriaxole | 50 |
| 3 | 2-(2'-hydroxy-5'-chlorophenyl)-benztriazole | 50 |
| 4 | 2-(2'-hydroxy-3'-tert. butyl-5'-methylphenyl)-benztriazole | 33 |
| 5 | 2-(2'-hydroxy-5'-methylphenyl)-5-chloro-benztriazole | 40 |
| Compounds according to the invention | | |
| 6 | 2-(2'-hydroxy-5'-β-carbodecyloxyethylphenyl)-benztriazole | 9 |
| 7 | 2-(2'-hydroxy-5'-β-carbobutoxyethylphenyl)-benztriazole | 12 |
| 8 | 2-(2'-hydroxy-5'-β-carbo-β'-ethylhexyloxyethylphenyl)-benztriazole | 8 |
| 9 | 2-(2'-hydroxy-5'-β-carbocyclohexyloxyethylphenyl)-benztriazole | 10 |
| 10 | 2-(2'-hydroxy-3'-o-carbobutoxyphenylmethyl-5'-methylphenyl)-benztriazole | 9 |

[1] After 250 hours in Fade-Ometer.

As can be seen from Table I, a much smaller loss on exposure occurs with the compounds of the present invention than with the previously known UV absorbers. This difference is probably due to the better fastness to sublimation of the actinic agents according to the invention compared with that of the comparative substances. If a foil containing the compound 1 in Table I is placed between two quartz plates which are puttied together and exposed in the same way as above, then under these conditions only a loss of 10% occurs. This improvement in the stability to sublimation is clearly seen in spinning polypropylene fibres. When compound 1 of the table is used, then a sublimation occurs which becomes apparent by the formation of "crystal beards" on the cold parts of the spinning machine, but when the compound of Example 3 is used, no such nuisance can be observed.

EXAMPLE 22

Cellulose acetate films were produced by drawing onto glass a solution consisting of 150 parts of acetyl cellulose (2½ Acetate, of Lonza A. G. Weil, Germany), 20 parts of dibutyl phthalate, 825 parts of acetone and 0.5 part of the compound 2-(2'-hydroxy-3',5'-dimethylphenyl)-5-β-carboethoxyethylmercapto-benztriazole. Cuttings from these films were exposed for 1000 hours in a fadeometer and the light absorbed at 365 mμ was measured before and after exposure. Transmission before exposure was 10% and after exposure 12%. The loss of content of UV absorber occurring on exposure was only 9%. The film so exposed showed no signs of brittleness which occur with films of the same composition but not containing actinic agent.

Light fast, UV-absorbing films can be produced in an analogous manner from other cellulose esters which are soluble in acetone.

EXAMPLE 23

100 parts of a marketed liquid polyester resin prepared from maleic anhydride, phthalate anhydride and aliphatic glycols (IC–312, Interchemical Corporation, N.Y.) are mixed with 0.2 part of the compound of the formula

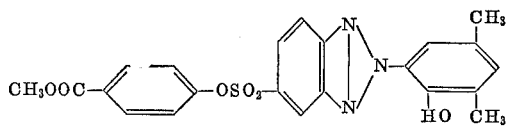

and 1 part of benzoyl peroxide and the mixture is then cured between two glass plates at 80°. The resulting 2 mm. thick polyester resin plate formed absorbs substantially all UV light of wave lengths under 360 mμ and shows an improved resistance to yellowing. Upon 500 hours' exposure in the fadeometer its loss in transmission at 420 mμ (which loss is a measure of the yellowing) is 3%, whereas a plate produced in the same way but without the addition of said light stabiliser shows a loss of 15% under the same conditions.

EXAMPLE 24

A mixture consisting of 65 parts of polyvinyl chloride (Lonza A.G., Basel. Switzerland), 32 parts of dioctyl phthalate 2 parts of barium-cadmium laurate and 1 part of 2-(2'-hydroxy-5'-β-carbobutylamidoethylphenyl)-benztriazole is drawn into a sheet from a set of two mixing rollers at 150°. The foil absorbs UV light and, at the same time, is protected from injury by light. After 750 hours' exposure in the fadeometer it was completely unchanged whereas a foil of analogous composition but not containing UV absorber had brown spots even after 500 hours.

EXAMPLE 25

100 parts of methylmethacrylate and 0.1 part of 2-(2'-hydroxy-5' - β - carbobutoxyethylphenyl)-benztriazole together with 0.2 part of lauroyl peroxide as polymerisation accelerator are mixed and polymerised at 70° in a glass mould into a plate of 4 mm. thickness. The plate was exposed for 1000 hours in a fadeometer and the transmission measured at 360 mμ; it was less than 1%—no different from that before exposure. The plate had neither a yellow colouring nor surface cracks. This material can, therefore, be used as light stable UV filter.

EXAMPLE 26

250 parts of powdery polypropylene free of antioxidant (Pro-Fax 6501 of Hercules Powder Co.) are intimately mixed with one part of

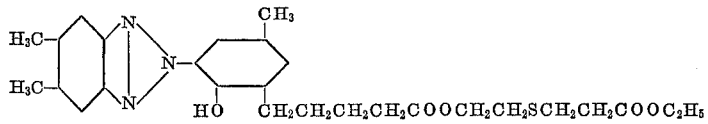

2-{2'-hydroxy-3-δ-[carbo-β'-β'' - carbethoxy - ethylmercapto)-ethoxy] - butyl - 5' - methylphenyl}5,6 - dimethylbenztriazole stabilizer. The mixture is calendered on a set of mixing rollers for 7 minutes at 175°, yielding a homogeneous sheet which is drawn from the rollers and cooled on a smooth surface. 50 parts of this sheeted material are moulded in a little hydraulic press at 200° to form a film of 0.6 mm. thickness. From this bands of 5 mm. width are cut and weathered under natural conditions and tested periodically with respect to their brittleness by manual bending. The aforementioned material forms cracks upon bending after two months' weathering while similar bands prepared without the addition of a stabiliser crack already after one month's weathering under the same conditions.

We claim:
1. A composition of matter comprising a stabilizing amount of a compound of the formula

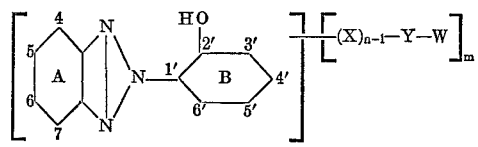

the molecular weight of which compound does not exceed 600, and in the formula of which X is a member selected from the group consisting of

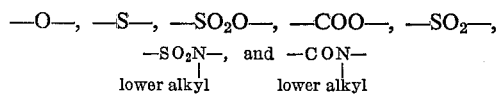

wherein said X is bound only by one of the oxygen, carbon and sulfur atoms contained in said X to at most one of the nuclei A and B, Y is a member selected from the group consisting of alkylene with 1 to 4 carbon atoms, lower alkyl-S-lower alkyl having a total of from 4 to 6 carbon atoms, and

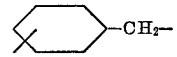

W is a member selected from the group consisting of
—COO.alkyl wherein the alkyl moiety is alkyl of 4 to 18 carbon atoms,
—COO.cycloalkyl wherein the cyclo alkyl moiety is cycloalkyl of 4 to 12 carbon atoms and —COO-benzyl, $m$ and $n$ are each independently of the other, one of the integers 1 and 2, the first $[(X)_{n-1}$—Y—W$]$ grouping being linked in one of the positions 5 at ring A, or 3', 4' or 5' at ring B, and a second grouping $[(X)_{n-1}$—Y—W$]$, if present, being linked to one of the aforesaid positions at that ring, of rings A and B, which is free from said first grouping, nucleus A is substituted in at least one of the 4, 5 and 6 positions which is free from said grouping $[(X)_{n-1}$—Y—W$]$, by at least one member selected from the group consisting of hydrogen, lower alkyl, lower alkoxy, alkoxy-carbonyl of from 2 to 19 carbon atoms, cyclohexyloxycarbonyl, benzyloxycarbonyl, phenoxycarbonyl, N-(mono-higher alkyl)-carbamyl and N-(mono-higher alkyl) sulfamyl, higher alkyl in the last two members having from 4 to 18 carbon atoms, N,N-di-alkyl-carbamyl, N,N-di-alkyl-sulfamyl, the total number of carbon atoms in both alkyl substituents of each of the two last-mentioned members not exceeding 20, N-cyclohexyl-sulfamyl, N-benzylsulfamyl, N-lower alkoxy-lower alkyl-sulfamyl, N - hydroxy-lower alkyl - sulfamyl, lower alkyl-sulfonyl and halogen, and the nucleus B is substituted in at least one of the 3'-, 4'-, and 5'-positions, not substituted by said grouping $[(X)_{n-1}$—Y—W$]$, by a member selected from the group consisting of hydrogen, lower alkyl, cycloalkyl of from 5 to 6 ring carbon atoms, chlorine, benzyl or phenyl, and, as the major component, an organic polymeric substrate selected from the group consisting of organic addition polymers, organic condensation polymers, organic mixed polymers and organic natural polymers with which at least 0.5% by weight, calculated on the total weight of said composition, of said compound is compatible, said compound rendering the resulting composition substantially impervious to the passage of ultraviolet light in the range of 300 to 350 millimicrons without impairing the normal transparency of said substrate to visible light.

2. A composition of matter as defined in claim 1, the compound of said formula being

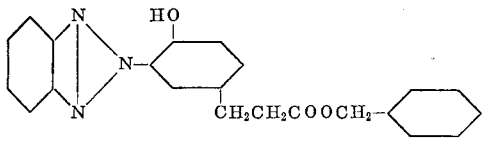

3. A composition of matter as defined in claim 1, the compound of said formula being

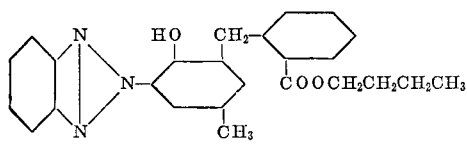

4. A composition of matter as defined in claim 1, the compound of said formula being

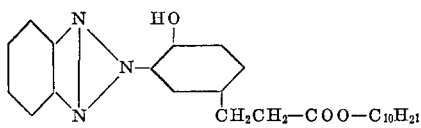

5. A composition of matter as defined in claim 1, the compound of said formula being

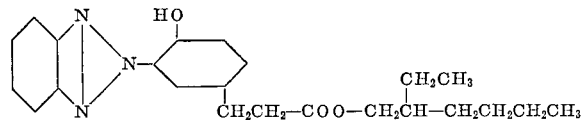

6. A composition of matter as defined in claim 1, the compound of said formula being

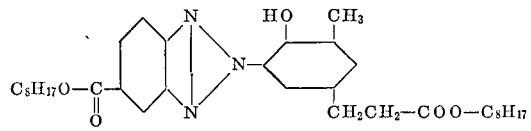

7. A composition of matter as defined in claim 1, the compound of said formula being

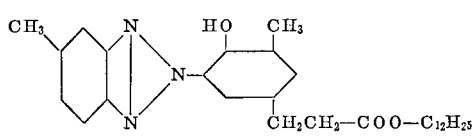

8. A composition of matter comprising a stabilizing amount of a compound of the formula

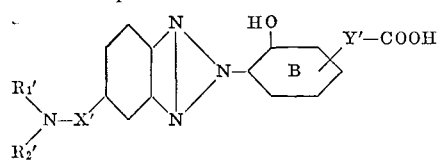

wherein X′ represents a member selected from the group consisting of —CO— and —SO$_2$—,
each of R$_1$′ and R$_2$′ represents hydrogen, lower alkyl, hydroxy-lower alkyl or lower alkoxy-lower alkyl, or R$_1$′ and R$_2$′ taken together with the nitrogen atom to which they are linked represent morpholino, Y′ represents lower alkylene attached to the 5′-position of ring B, or butylene or benzylene attached to the 3′-position of ring B,
and ring B is further substituted, apart from the grouping —Y′—COOH, by a member selected from the group consisting of hydrogen and lower alkyl,
or a sodium or aliphatic amine salt thereof, soluble or homogeneously distributable in an aqueous or alcoholic medium, and, as the major component, an organic polymeric substrate selected from the group consisting of organic addition polymers, organic condensation polymers, organic mixed polymers and organic natural polymers with which at least 0.5% by weight, calculated on the total weight of said composition, of said compound is compatible, said compound rendering the resulting composition substantially impervious to the passage of ultraviolet light in the range of 300 to 350 millimicrons without impairing the normal transparency of said substrate to visible light.

9. A composition of matter as defined in claim 8, the compound of said formula being

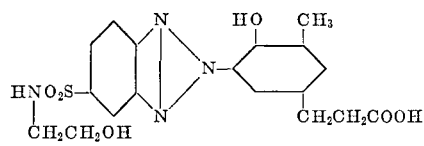

10. A composition of matter comprising a stabilizing amount of a compound of the formula

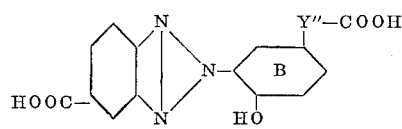

wherein Y″ represents lower alkylene,
and ring B is further substituted by hydrogen or lower alkyl, or a sodium or aliphatic amine salt thereof, soluble or homogeneously distributable in an aqueous or alcoholic medium, and, as the major component, an organic polymeric substrate selected from the group consisting of organic addition polymers, organic condensation polymers, organic mixed polymers and organic natural polymers with which at least 0.5% by weight, calculated on the total weight of said composition, of said compound is compatible, said compound rendering the resulting composition substantially impervious to the passage of ultraviolet light in the range of 300 to 350 millimicrons without impairing the normal transparency of said substrate to visible light.

11. A composition of matter comprising a stabilizing amount of a compound of the formula

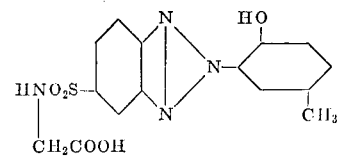

and, as the major component, an organic polymeric substrate selected from the group consisting of organic addition polymers, organic condensation polymers, organic mixed polymers and organic natural polymers with which at least 0.5% by weight, calculated on the total weight of said composition, of said compound is compatible, said compound rendering the resulting composition substantially impervious to passage of ultraviolet light in the range of 300 to 350 millimicrons without impairing the normal transparency of said substrate to visible light.

12. A composition of matter comprising a stabilizing amount of a compound of the formula

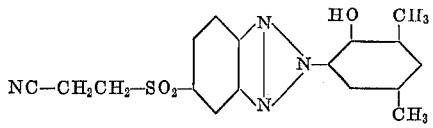

and, as the major component, an organic polymeric substrate selected from the group consisting of organic addition polymers, organic condensation polymers, organic mixed polymers and organic natural polymers with which at least 0.5% by weight, calculated on the total weight of said composition, of said compound is compatible, said compound rendering the resulting composition substantially impervious to the passage of ultraviolet light in the range of 300 to 350 millimicrons without impairing the normal transparency of said substrate to visible light.

References Cited

UNITED STATES PATENTS

| | | | |
|---|---|---|---|
| 3,189,615 | 6/1965 | Heller et al. | 260—308 |
| 3,272,891 | 9/1966 | Milionis et al. | 260—895 |
| 3,337,356 | 8/1967 | Carboni | 106—176 |
| 3,413,227 | 11/1968 | Howard et al. | 252—51.5 |

HOSEA E. TAYLOR, Primary Examiner

R. A. WHITE, Assistant Examiner

U.S. Cl. X.R.

106—176; 260—308, 398.5